(12) United States Patent
Al-Qadhi et al.

(10) Patent No.: US 9,334,387 B2
(45) Date of Patent: May 10, 2016

(54) METHOD FOR PREPARATION OF EPOXY-CLAY NANOCOMPOSITES

(71) Applicants: KING FAHD UNIVERSITY OF PETROLEUM AND MINERALS, Dhahran (SA); KING ABDULAZIZ CITY FOR SCIENCE AND TECHNOLOGY, Riyadh (SA)

(72) Inventors: Muneer Abdulrahman Mohammed Al-Qadhi, Dhahran (SA); Necar Merah, Dhahran (SA)

(73) Assignees: KING FAHD UNIVERSITY OF PETROLEUM AND MINERALS, Dhahran (SA); KING ABDULAZIZ CITY FOR SCIENCE AND TECHNOLOGY, Riyadh (SA)

(*) Notice: Subject to any disclaimer, the term of this patent is extended or adjusted under 35 U.S.C. 154(b) by 330 days.

(21) Appl. No.: 14/023,458

(22) Filed: Sep. 10, 2013

(65) Prior Publication Data
US 2015/0069294 A1 Mar. 12, 2015

(51) Int. Cl.
*C08K 3/34* (2006.01)
*C08L 79/04* (2006.01)
*C08J 3/20* (2006.01)
*C08L 61/00* (2006.01)
*C08L 61/04* (2006.01)
*C08L 61/06* (2006.01)
*C08L 63/00* (2006.01)

(52) U.S. Cl.
CPC ............ *C08K 3/346* (2013.01); *C08J 3/203* (2013.01); *C08L 61/00* (2013.01); *C08L 61/04* (2013.01); *C08L 61/06* (2013.01); *C08L 63/00* (2013.01); *C08L 79/04* (2013.01); *C08J 2363/00* (2013.01)

(58) Field of Classification Search
None
See application file for complete search history.

(56) References Cited

U.S. PATENT DOCUMENTS 5,554,670 A * 9/1996 Giannelis .............. B82Y 30/00
523/209
8,227,527 B2 7/2012 Hoa et al.
(Continued)

OTHER PUBLICATIONS

Ngo, T.D. et al., "Modeling the Delamination Process During Shear Premixing of Nanoclay/Thermoset Polymer Nanocomposites", Journal of Applied Polymer Science, 122(1), 561-572, 2011.

*Primary Examiner* — Joseph D Anthony
(74) *Attorney, Agent, or Firm* — Richard C. Litman

(57) ABSTRACT

The method for the preparation of epoxy-clay nanocomposites uses high shear mixing of Nanomer I.30 E nanoclay into the diglycidyl ether of bisphenol A (DGEBA) epoxy by optimization of high shear mixing speeds, mixing times and degassing temperature. The results showed that the optimum high shear mixing speed and mixing time for optimal clay dispersion were 6000 rpm and 60 min, respectively. Increasing the degassing temperature from 65° C. to 100° C. for the first two hours of the degassing process enhanced nanoclay dispersion, resulting in nanocomposites with a morphology dominated by disorder intercalation with some exfoliated structure. This enhancement in nanocomposite morphology can be attributed to the improvement in epoxy diffusion into the intergallery spacing between clay layers due to temperature rise.

5 Claims, 6 Drawing Sheets

(56) References Cited

U.S. PATENT DOCUMENTS

| | | | | |
|---|---|---|---|---|
| 2005/0127329 A1* | 6/2005 | Wang | ............... | B82Y 10/00 252/500 |
| 2005/0245665 A1* | 11/2005 | Chen | ............... | B82Y 30/00 524/493 |
| 2006/0079623 A1* | 4/2006 | Chen | ............... | B82Y 30/00 524/445 |
| 2006/0287413 A1* | 12/2006 | Lin | ............... | C01B 33/12 523/216 |
| 2007/0299202 A1* | 12/2007 | Hoa | ............... | C08J 3/205 524/588 |
| 2008/0090952 A1* | 4/2008 | Isik | ............... | C08F 292/00 524/447 |
| 2008/0153967 A1* | 6/2008 | Isik | ............... | C08F 292/00 524/445 |
| 2009/0047595 A1* | 2/2009 | McDougall | ............... | G03G 9/0804 430/137.14 |
| 2010/0010119 A1* | 1/2010 | Zaarei | ............... | B82Y 30/00 523/461 |

* cited by examiner

| Sample | Mixing Time (min) | Mixing Speed (rpm) |
|---|---|---|
| 1 | | 500 |
| 2 | | 1000 |
| 3 | 30 | 2000 |
| 4 | | 4000 |
| 5 | | 6000 |
| 6 | | 8000 |

*Fig. 1*

| Samples | Diffraction Angles (°) | d-spacing (A°) |
|---|---|---|
| I.30E Clay | 4.0 | 22.07 |
| Sample mixed at 2000 (rpm) | 3.56 | 24.80 |
| Sample mixed at 4000 (rpm) | 3.46 | 25.52 |
| Sample mixed at 6000 (rpm) | 3.16 | 27.94 |
| Sample mixed at 8000 (rpm) | 3.3 | 26.75 |

| Sample | Mixing Time (min) | Mixing speed (rpm) |
|---|---|---|
| 1 | 15 | 6000 |
| 2 | 30 | |
| 3 | 45 | |
| 4 | 60 | |
| 5 | 90 | |

*Fig. 6*

| Samples | Diffraction Angles (°) | d-spacing (A°) |
|---|---|---|
| I.30E Clay | 4.0 | 22.07 |
| Sample mixed for 15 (min) | 3.2 | 27.59 |
| Sample mixed for 30 (min) | 3.16 | 27.94 |
| Sample mixed for 45 (min) | 3.09 | 28.57 |
| Sample mixed for 60 (min) | 3.05 | 28.94 |
| Sample mixed for 90 (min) | 3.045 | 28.99 |

METHOD FOR PREPARATION OF EPOXY-CLAY NANOCOMPOSITES

BACKGROUND OF THE INVENTION

1. Field of the Invention

The present invention relates to epoxy-clay nanocomposites, and particularly to a method for preparation of epoxy-clay nanocomposites by high shear mixing.

2. Description of the Related Art

Nanoclay reinforced polymer nanocomposites have attracted considerable attention lately because the dispersion of nanometer-thin layered structure of nanoclay in a polymer matrix offers new and greatly improved properties over pristine polymers. The unique layered structure of a collection of 1 nm thin, high strength, and high aspect ratio (up to 1000) clay sheets enables nanoclays to improve polymer matrix properties at very low clay loadings. A number of clay fillers and different mixing techniques have been used to synthesize polymer-clay nanocomposites. Depending on the morphology of the resultant nanocomposites, improvements in tensile strength, modulus, fracture strength, glass transition temperature, and reduction in moisture absorption of polymers have been reported for a variety of nanocomposite systems.

The improvement in the properties of polymers as a result of clay addition depends on a number of parameters, including the type of polymer and clay, curing conditions, clay concentration, and the techniques that are used to disperse the clay into the polymer matrix. Contradictory results have been reported about the effect of clay addition on the mechanical and physical properties of epoxy. For instance, improvements in the tensile strength and modulus of elasticity, flexural and compressive strength, fracture toughness and glass transition temperature ($T_g$) have been demonstrated by the addition of nanoclay into epoxy matrix. However, other studies reported either no effect, or reduction in tensile strength, flexural and compressive strength, fracture toughness and glass transition temperature with the clay addition.

The properties of polymer nanocomposites are highly dependent on the resultant morphology, which illustrates the degree of clay dispersion within a polymer matrix. Based on the material types and the dispersion techniques, two nanoclay structural morphologies, i.e., intercalated or exfoliated morphologies, have been reported. In the intercalated form, matrix polymer molecules are introduced between the ordered layers of clay, resulting in an increase in the interlayer spacing. However, in the exfoliated form, clay layers are separated and distributed within the matrix. The degree of clay dispersion is believed to be the key factor responsible for the change in the properties of polymer-clay nanocomposites, and exfoliated structures are reported to possess better properties than the intercalated ones. The exfoliated morphology of polymer-clay nanocomposites yields the maximum improvement in properties because maximum reinforcement is achieved with the tearing away of the individual sheets from the nanoclay tactoids and their more effective dispersion in the polymer matrix.

There are three general ways of dispersing clay in polymers, namely, (i) the direct mixing of the polymer and clay, either as discrete phases or in solution; (ii) in situ polymerization in the presence of clay; and (iii) both in situ formation of nanoparticles and in-situ polymerization. Using in-situ polymerization, different processing techniques are utilized to disperse the clay in epoxy monomers or monomers solution, including simple mechanical mixing, ultrasonication mixing, high shear mixing, and slurry-compounding. The most common techniques that are used to synthesize epoxy-clay nanocomposites are ultrasonication mixing and shear mixing. Nanocomposites processed by high shear mixing are reported to exhibit better mechanical properties as compared to those processed by ultrasonication due to a higher degree of clay dispersion achieved by high shear mixing. In high shear mixing. the shear force reduces the size of the clay particles by splitting, and increases interlayer spacing by the forced entry of the epoxy monomer between the clay galleries. Higher mixture viscosity and high mixing speed tend to generate higher shear force during mixing, and thus provide better clay dispersion.

Thus, a method for preparation of epoxy-clay nanocomposites solving the aforementioned problems is desired.

SUMMARY OF THE INVENTION

The method for the preparation of epoxy-clay nanocomposites uses high shear mixing of Nanomer I.30 E nanoclay into the diglycidyl ether of bisphenol A (DGEBA) epoxy by optimization of high shear mixing speeds, mixing times and degassing temperature. The nature and degree of dispersion of Nanomer I.30 E nanoclay into the diglycidyl ether of bisphenol A (DGEBA) epoxy was then evaluated. A number of nanocomposite samples were produced by varying high shear mixing speed from 500 to 8,000 RPM and mixing time from 15 to 90 minutes. The process-induced morphological changes in the structural character of nanoclay tactoids in the epoxy matrix was extensively examined using SEM, TEM and XRD. The method focuses on determining the mixing speed and mixing time that produce the optimum clay dispersion in I.30E/DGEBA nanocomposites.

These and other features of the present invention will become readily apparent upon further review of the following specification and drawings.

BRIEF DESCRIPTION OF THE DRAWINGS

FIG. 1 is a table showing the setting of mixing parameters for epoxy-clay nanocomposites samples prepared to investigate the effect of mixing speed.

FIG. 6 is a table showing the setting of mixing parameters for epoxy-clay nano composite samples prepared using the optimum high shear mixing speed of 6000 rpm to examine the effect of mixing time.

DETAILED DESCRIPTION OF THE PREFERRED EMBODIMENTS

Figure 2:
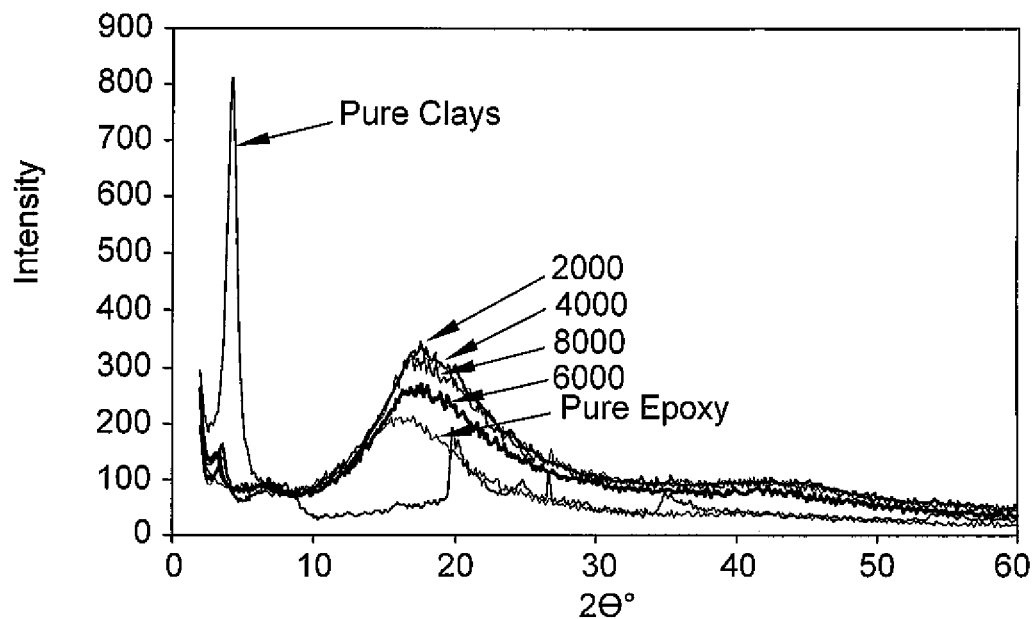
FIG. 2 is the XRD spectra for clay powder, neat epoxy and epoxy-clay nanocomposites prepared at different high shear mixing speeds.

The method of preparation of epoxy-clay nanocomposites comprises high shear mixing of Nanomer I.30E nanoclay as nano-reinforcement in diglycidyl ether of bisphenol A (DGEBA) epoxy at an optimum high shear mixing speed and mixing time to obtain a high degree of clay dispersion. The effect of mixing speed and time on the nature and degree of clay dispersion were investigated by varying the mixing speed in the range of 500-8000 RPM and mixing time in the range of 15-90 minutes. The effect of degassing temperature on the morphology of the resultant nanocomposites was also studied. Scanning and transmission microscopy (SEM & TEM) along with x-ray diffraction (XRD) have been used to characterize the effect of shear mixing speed, mixing time and degassing temperature on the structure of the resultant nanocomposites. SEM, TEM and XRD examinations demonstrated that the degree of clay dispersion was improved with increasing the high shear mixing speed and mixing time. The results showed that the optimum high shear mixing speed and mixing time were 6000 rpm and 60 min, respectively. It was observed that the structure of the nanocomposites that have been degassed at 65° C. was dominated by ordered intercalated morphology, while disordered intercalated with some exfoliated morphology was found for the sample degassed at 100° C. for the first 2 hours of the degassing process.

The diglycidyl ether of bisphenol A (DGEBA), used to test the method was supplied by JANA, Saudi Arabia. The DGEBA supplied with the trade name GY 6010 had an average weight per epoxide of 186 g/eq, viscosity at 25° C. of 11 Pa·s, and density of 1.16 g/cm$^3$. The curing agent was isophoronediamine (IPDA), a product of HUNTSMAN International, LLC, USA. The average viscosity and density at 25° C. of this hardener were 0.015 Pa·s and 0.92 g/cm$^3$, respectively. The clay was Nanomer I.30 E, from Nanocor Inc, USA, which is modified montmorillonite clay that belongs to the smectite type. The chemical composition of ½ crystalline unit cell of unmodified montmorillonite clay is $[Al_{1.67}Mg_{0.33}(Na_{0.33})]Si_4O_{10}(OH)_2$. The clay has a layered structure with 1 nm thickness. Each platelet in the clay particle is made up of an octahedral sheet sandwiched between two opposing tetrahedral sheets. The montmorillonite clay in the Nanomer I.30E has been modified with primary octadecyl ammonium ion, which is one of the alkylammonium ions.

All epoxy-clay nanocomposite samples prepared to determine the optimum shear mixing parameters contain 2 wt. % clay loading, since this clay loading was reported to be the optimum clay loading in a number of previous studies. The synthesis of nanocomposites was started mixing the clay into the epoxy resin by hand for 5 minutes using a stirring rod. This initial mixing is important to properly blend the clay powder into the epoxy resin and prevent the clay powder from 'flying away' during the subsequent high shear mixing. After the hand mixing, a high shear mixer (Model L4RT, Silverson, UK) was used to disperse the clay into epoxy matrix. During high shear mixing, the mixture temperature was maintained between 35-45° C. by using a cold water bath. After high shear mixing the epoxy/clay mixture was degassed at 65° C. for 10 hours to remove air bubbles generated during high shear mixing. After degassing, the hardener with stoichiometric ratio of 24:100 w/w was added to the mixture and gently mixed for 5 minutes. The mixture was then poured into an aluminum mold and pre-cured at 100° C. for one hour, followed by post-curing at 170° C. for another hour. These curing conditions were found by M. Al-Qadhi et al. (Key Engineering Materials, 471-472, 2011, 415-419) to be optimum for the type of epoxy and hardener used.

The nature and degree of nanoclay dispersion in the synthesized nanocomposites were investigated using scanning electron microscopy (SEM), X-ray diffraction (XRD), and transmission electron microscopy (TEM). All scans for XRD were performed from 2θ=2 to 10° using steps of 0.02°. TEM specimens were cut by a diamond knife into slices of 150 nm thickness that collected on copper grids and moved to TEM for inspection.

The induced shear force during high shear mixing varies with the mixing speed. The generated shear force decreases the size of the nanoclay particles by splitting the particles, and increases the interlayer spacing in the clay particles by forcing the epoxy monomer into the galleries between the clay layers. To determine the effect of mixing speed on the degree of clay dispersion, six samples of nanocomposites were prepared with different mixing speeds (500-8000 rpm), as listed in FIG. 1. It was observed that at low mixing speeds of 500 and 1000 rpm, the generated shear forces and vortices were not adequate enough to properly blend the mixture, and hence these samples were excluded from further analysis. Optical micrographs for neat epoxy and nanocomposites prepared at different mixing speeds for 30 minutes were taken. The clay aggregates appear as dark spots in all nanocomposite micrographs. The average size of the aggregates seems to decrease with increasing mixing speed.

The effect of mixing speed on the clay dispersions was further analyzed by SEM micrographs. The nanocomposite micrographs are characterized by scattered whitish nodular features representing clusters of agglomerated clay. The size of the largest clay aggregates decrease from about 50 μm at 2000 rpm to less than 20 μm at 6000 rpm. No further reduction in the cluster size was observed for the sample mixed at 8000 rpm. At this high speed, the viscosity of the epoxy solution may be reduced due to the increase in temperature and bubbles generated during mixing.

XRD was then used to investigate the effect of high shear mixing speed on the nanocomposite structures, precisely, the degree of intercalation/exfoliation of the clay layers in the nanocomposites. FIG. 2 shows the full spectra x-ray diffraction of I.30E clay powder, neat epoxy, and nanocomposites mixed using different mixing speeds. As illustrated in FIG. 2, the diffraction angle for the clay powder was 4.0°, resulting in a d-spacing of 2.2 nm.

Figure 3:
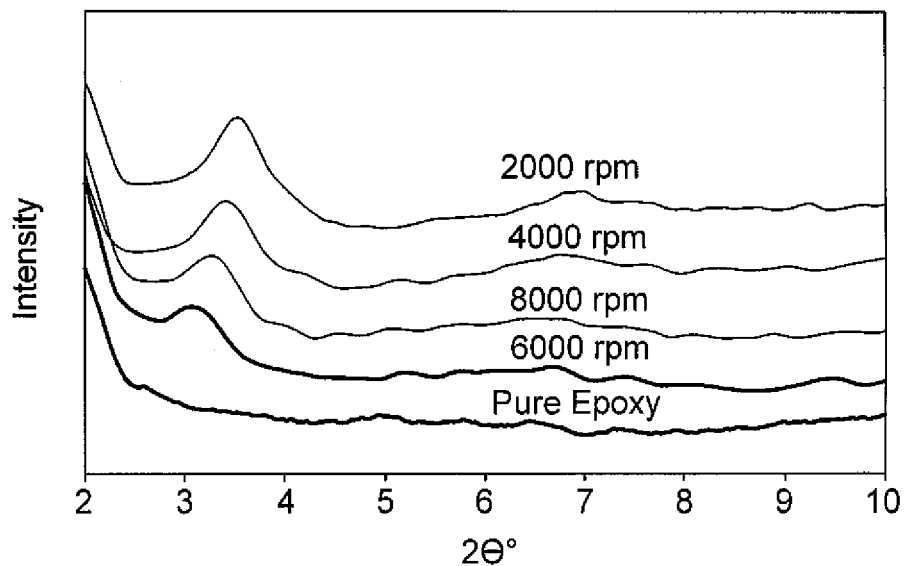
FIG. 3 is the XRD spectra for neat epoxy and epoxy-clay nanocomposites prepared at different high shear mixing speeds.

To have a better estimation of the diffraction angles for prepared nanocomposites, the data in FIG. 2 was re-plotted in FIG. 3 with 2θ varying between 2 and 10°. As illustrated in FIG. 2, the peak of the clay powder (2θ=4°) is prominent and sharp, indicating large clay particles, the layers of which are highly ordered stacks. However, no peaks are observed for neat epoxy, confirming the amorphous nature of the material structure. Meanwhile, observable peaks are present for the nanocomposites, with intensities lower than that for clay powder. The angular positions of the nanocomposites peaks are less than that of the clay powder, and decreased with increasing high shear mixing speed, indicating higher d-spacing, as illustrated in FIG. 4.

Figures 4, 5:
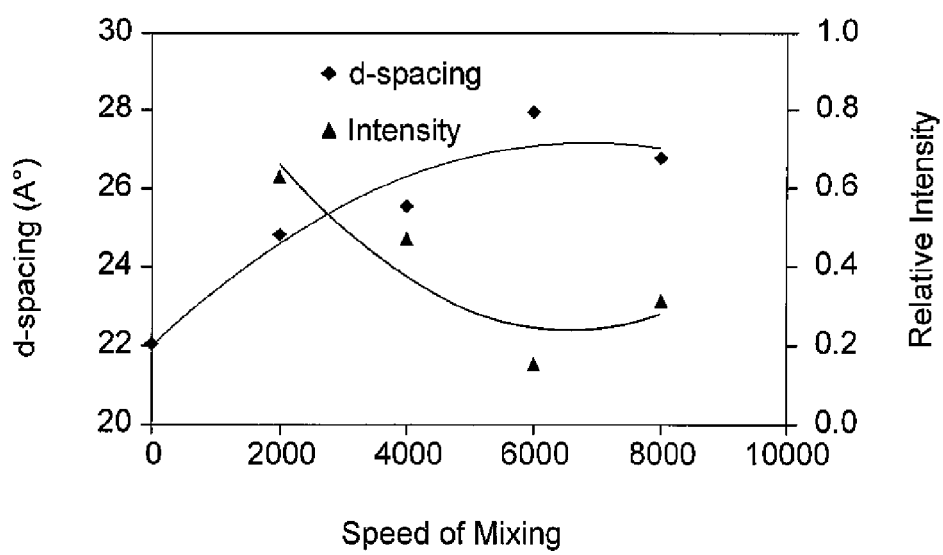
FIG. 4 is a table showing diffraction angles and d-spacings for clay powder and epoxy-clay nanocomposites prepared using different high shear mixing speeds.
FIG. 5 is a plot showing variations of d-spacings and peak relative intensities at the diffraction angles with high shear mixing speed.

The variations of d-spacings and peak relative intensities with the high shear mixing speed are illustrated in FIG. 5. As can be seen in the drawing, the d-spacings increased with increasing mixing speed, indicating that more chains of epoxy molecules have diffused into the intergallery between the clay layers. Whereas, the peaks' relative intensity decreased with increasing mixing speed, indicating less orderly clay layers were present in each clay tactoid, which means that the sizes of clay tactoids and clay particles that remain in orderly stack after mixing are smaller. As shown in FIG. 5, the maximum d-spacing and minimum peak intensity were for the nanocomposite prepared at high shear mixing speed of 6000 rpm. The reduction in the d-spacing and increase in the peak intensity for 8000 rpm can be attributed to the decrease in the viscosity of the epoxy solution that results from the observed increase in temperature and bubbles generated during mixing. This reduction in the viscosity leads to a decrease in the shear force during high shear mixing of epoxy and clay. The above findings, combined with SEM results, lead to the conclusion that the optimum clay dispersion was achieved at the high shear mixing speed of 6000 rpm.

After determining the optimum mixing speed at a mixing time of 30 minutes, 5 samples of nanocomposites have been prepared to find the mixing time for the optimum dispersion of the Nanomer I.30E in DGEBA epoxy. These samples were prepared using the optimum high shear mixing speed of 6000 rpm, and mixing times were varied from 15 to 90 minutes, as listed in FIG. 6. Optical micrographs and SEM micrographs for these nanocomposites were taken. It can be seen from these figures and from the SEM micrographs that the size of the clay aggregate decreased with increasing mixing time, indicating an improvement in the degree of clay dispersion. The clay aggregates seem to be broken down with increasing mixing time. The size of the largest clay cluster decreased from about 50 μm for 15 min to less than 15 μm for 60 minutes. Beyond 60 minutes, the improvement in the degree of clay dispersion was found to be negligible.

The dispersion of clay inside the nanocomposites can be further investigated by increasing the magnification of the SEM micrographs. Magnified SEM micrographs for nanocomposite prepared at 6000 rpm for 60 minutes at 600 times and 1000 times magnification were taken. The micrographs revealed that only some of the clay aggregates are in the order of 10 μm in size, while the majority of clay aggregates have sizes less than 5 μm.

Figures 7, 8:
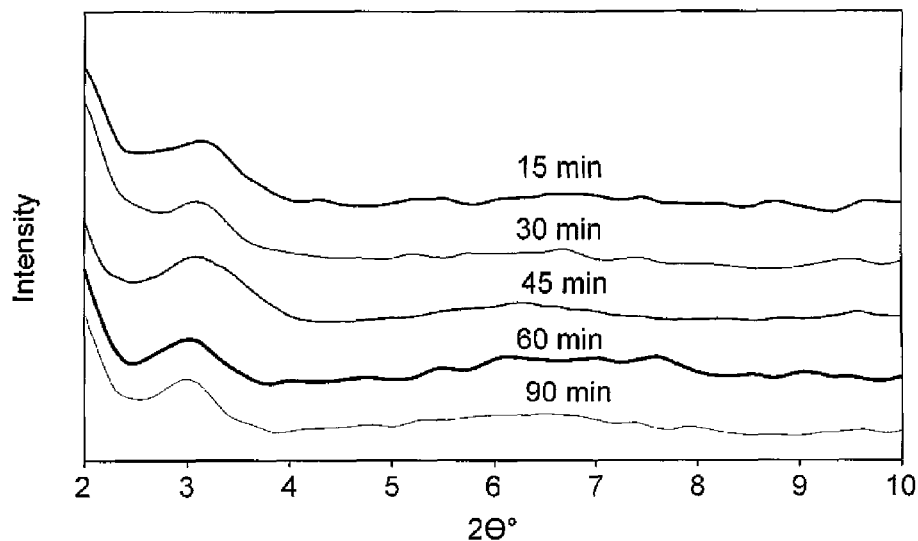
FIG. 7 is the X-ray diffraction spectra for epoxy-clay nanocomposites prepared using different mixing times.
FIG. 8 is a table showing the variation of diffraction angles and the d-spacings with mixing time.
Figure 9:
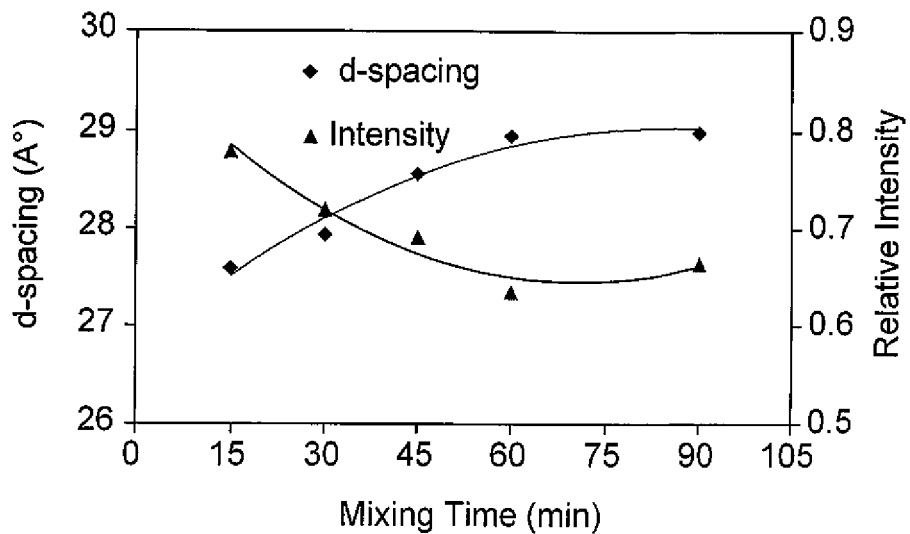
FIG. 9 is a plot showing the effect of mixing time on d-spacing and relative intensity at the diffraction angles.

The x-ray diffraction spectra curves for nanocomposites prepared at different mixing times are shown in FIG. 7. The variation of diffraction angles and the d-spacings with mixing time is illustrated in FIG. 8. The effect of mixing time on d-spacing and relative intensity at the diffraction angles is expressed graphically in FIG. 9. As can be seen in the figure, increasing the mixing time led to increasing the d-spacing, and hence improving the degree of clay dispersion. The d-spacing increased from 22.07 Å for the clay powder to 28.94 Å for the sample mixed for 60 minutes. The improvement in the d-spacing when the mixing time increased to 90 min was negligible, as clearly shown in FIG. 9. Similarly, the relative intensities at the diffraction angles reduced with increasing the mixing time, indicating an improvement in the degree of clay dispersion, as shown in FIG. 9. The above findings lead to the conclusion that the optimum clay dispersion at 6000 rpm was achieved with mixing time of 60 minutes.

Figure 10:
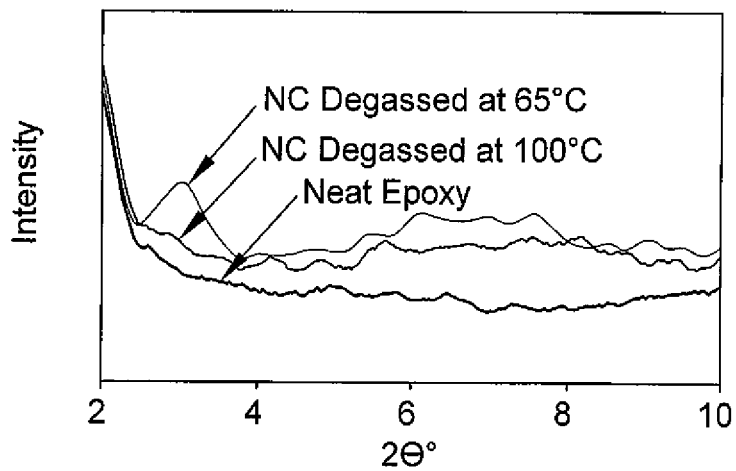
FIG. 10 is the X-ray diffraction spectra curves for neat epoxy and epoxy-clay nanocomposites (NC) that have been degassed at 65° C. and 100° C.

After determining the optimum high shear mixing parameter at a degassing temperature of 65° C. for 10 hours, new samples were prepared by degassing at 100° C. for 2 hours and then at 65° C. for 8 hours to investigate the effect of degassing temperature on the morphology of the resultant nanocomposite. No peak was observed in the XRD spectra for the samples that have been degassed at 100° C. for the first 2 hours of the degassing process (FIG. 10). The absence of peaks in XRD spectra is an indication of either disorder intercalated or exfoliated morphology. This type of morphology is evidenced by the TEM image, which showed both disorder intercalated and exfoliated morphology. As was clear from the TEM micrograph, the d-spacing of the disordered intercalation morphologies varied from 3 to 15 nm for the sample degassed at 100° C. for 2 hours, while the d-spacing for nanocomposites degassed at 65° C. for 10 hours was about 3 nm. This improvement in the nanocomposite structure can be attributed to the enhancement of epoxy diffusion process into the intergallery between clay layers due to the viscosity reduction resulted from higher degassing temperature.

The effect of high shear mixing parameters and degassing temperature on the degree of I.30 E nanoclay dispersion in DGEBA epoxy was investigated. The results showed that increasing the high shear mixing speed and mixing time lead to improving clay dispersion and increasing d-spacing of clay layers in the nanocomposites. The optimum mixing speed and mixing time were 6000 rpm and 60 min, respectively. The results showed that the d-spacing was increased from 2.2 nm for clay powder to about 2.9 nm for the nanocomposite synthesized with optimum mixing parameters. Increasing the degassing temperature from 65° C. to 100° C. for the first two hours of the degassing process enhanced nanoclay dispersion, resulting in a morphology dominated by disorder intercalation with some exfoliated structure, compared to order intercalated morphology for the samples degassed at 65° C. This enhancement in nanocomposite morphology can be attributed to the improvement in epoxy diffusion into the intergallery spacing between clay layers due to temperature rise.

It is to be understood that the present invention is not limited to the embodiments described above, but encompasses any and all embodiments within the scope of the following claims.

We claim:

1. A method for the preparation of epoxy-clay nanocomposites, comprising the step of high shear mixing of Nanomer I.30E nanoclay with diglycidyl ether of bisphenol A (DGEBA) epoxy at a mixing speed in the range of 6000 rpm to 8000 rpm over a time period between 15 minutes and 60 minutes.

2. The method for the preparation of epoxy-clay nanocomposites according to claim 1, wherein the high shear mixing speed is 6000 rpm.

3. The method for the preparation of epoxy-clay nanocomposites according to claim 1, wherein Nanomer I.30E nanoclay is mixed with diglycidyl ether of bisphenol A (DGEBA) epoxy for a period of 60 minutes.

4. The method for the preparation of epoxy-clay nanocomposites according to claim 1, further comprising the step of degassing the mixture of Nanomer I.30E nanoclay and diglycidyl ether of bisphenol A (DGEBA) epoxy at a temperature of 65° C. for 10 hours.

5. The method for the preparation of epoxy-clay nanocomposites according to claim 1, further comprising the step of degassing the mixture of Nanomer I.30E nanoclay and diglycidyl ether of bisphenol A (DGEBA) epoxy at a temperature of 100° C. for 2 hours, followed by degassing at 65° C. for 8 hours.

* * * * *